3,120,099
STABLE PROPELLANTS
Leonard A. Stengel, Terre Haute, Ind., assignor to Commercial Solvents Corporation, New York, N.Y., a corporation of Maryland
No Drawing. Filed May 23, 1960, Ser. No. 31,235
18 Claims. (Cl. 60—35.4)

My invention relates to new propellants for reaction motors and, more particularly, to liquid propellant solutions prepared from monomethylamine and a salt selected from the group consisting of lithium chlorate and lithium perchlorate.

I have now discovered that solutions of monomethylamine and a salt selected from the group consisting of lithium chlorate and lithium perchlorate are excellent monopropellants and fuels. As the oxygen balance of my new solutions can be varied over a wide range, my compositions find a variety of uses in the propellant field. Some of my new compositions, having a high ratio of reducing potentials to oxidizing potentials, are useful as fuels for air-breathing engines, such as pulse jets and ramjets, and as fuels for bipropellant reaction motor systems, while my solutions having approximately stoichiometric amounts of the above-named salts and monomethylamine are excellent monopropellants.

My new compositions have further advantages in that they are relatively noncorrosive to cold rolled steel and aluminum, and relatively nonreactive with rubber, Teflon, and polyethylene, etc. My new compositions also have low vapor pressures and can be stored for long periods of time without decomposition. Furthermore, my new monopropellant compositions have specific impulses on the order of up to 210–215 pound seconds per pound and density impulses of about 300 seconds at 300 p.s.i.a. operating pressure.

While monomethylamine and a salt selected from the group consisting of lithium chlorate and lithium perchlorate are meant to compose the major part of my compositions, various additives may be added to my mixtures. Such additives must be non-reactive with lithium perchlorate, monomethylamine, lithium chlorate, or other additives at ordinary storage temperatures and pressures in such a manner as to materially reduce the desired explosive or propellant properties of the mixture. Examples of such additives are lower alkanols such as methanol and ethanol, aluminum, magnesium, anhydrous ammonia, lower alkyl amines, ammonium perchlorate, monomethylamine nitrate, and the like. The additives may be introduced into my mixtures to sensitize or desensitize the compositions, to add oxidizing or reducing potentials to the compositions, to catalyze the burning rate of the mixtures, to make the mixtures hypergolic with strong oxidants, to depress the freezing points of the mixtures, to lower the average molecular weight of the exhaust gases or to reduce the burning temperatures of the mixtures.

Many additives, particularly water, tend to cause lithium perchlorate to precipitate from the solution when used even in small amounts. I have found, however, that when ammonia is added to my compositions containing lithium perchlorate, the lithium perchlorate does not precipitate even in the presence of water. When metals such as aluminum and magnesium in quantities up to about 5% are added to my compositions containing lithium perchlorate, there is no appreciable precipitation of the lithium perchlorate from my mixtures. The additives useful in my invention other than aluminum and magnesium may be used in quantities up to about 20%.

The compositions of my invention have very low vapor pressures, on the order of 5 pounds or less at room temperatures and pressures.

My new compositions are prepared by passing anhydrous monomethylamine into the solid salts. I prefer to prepare my compositions at temperatures below the boiling point of monomethylamine due to ease of handling.

My compositions are easily adapted to a variety of uses in the propellant field. My compositions containing from about 60% to about 75% of a salt selected from the group consisting of lithium chlorate and lithium perchlorate and from about 25% to about 40% by weight of monomethylamine are excellent monopropellants. Solutions that are very fuel-rich, containing from about 20% to about 60% by weight of one of the above salts and from about 40% to about 80% by weight of monomethylamine, are useful as bipropellant fuels in rockets or fuels for ramjets, etc. However, when ammonia is used as an additive, as low as 20% by weight monomethylamine may be used in my compositions.

To utilize the propellant solutions of my invention, I introduce them at a desired rate into a reaction chamber containing a suitable igniter such as a starting squib, a white hot platinum grid, or a glow plug to initiate combustion.

As previously stated, compositions containing from about 20% to about 60% by weight of one of the aforementioned salts are useful as fuels for reaction motors such as ramjets, or as fuels for bipropellant rocket systems. The use of such fuels for bipropellant systems means that less oxident is required as the high specific gravity fuel carries considerable amounts of oxygen.

Oxidants which may be utilized in my fuel mixtures and bipropellant systems are any of the commonly used oxidants, such as liquid oxygen, red and white fuming nitric acid, dinitrogen tetroxide, etc. When my compositions are used in air-breathing engines, such as ramjets or pulse jets, principles of operation which apply are similar to those applicable to present day engines employing ordinary hydrocarbon fuels. In all of these engines, the oxygen in the air is mixed with the fuel so that the fuel-air ratio is approximately stoichiometric. In this way, complete burning and efficient operation of the engine is assured. For example, when a 50% lithium perchlorate, 50% amine mixture is used as a ramjet engine fuel, a ratio of 1:18 air to fuel by weight is desired. During or after combustion of my fuels in the combustion chambers of the reaction engines, large amounts of excess air are passed through the engines in order that the combustion chamber walls may be maintained at desired temperatures.

The following table sets out a number of compositions within the scope of my invention.

TABLE I

| Percent Oxidant | Percent Amine | Percent Additive |
|---|---|---|
| 75% lithium perchlorate | 25% monomethylamine | |
| 55% lithium perchlorate | 25% monomethylamine | 20% ammonium-perchlorate. |
| 65% lithium perchlorate | 20% monomethylamine | 15% ammonia. |
| 59% lithium perchlorate | 23.1% monomethylamine | 17.9% ammonia. |
| 60% lithium chlorate | 40% monomethylamine | |
| 65% lithium chlorate | 20% monomethylamine | 15% ammonia. |

The following tables set out the physical properties of representative solutions coming within the scope of my invention.

TABLE II

*Some Physical Properties of Lithium Perchlorate-Monomethylamine Solutions*

| | | |
|---|---|---|
| Percent Wt. lithium perchlorate | 72.3 | 67.7 |
| Mole ratio amine to perchlorate | 1:0.77 | 1:0.61 |
| Density, degrees: | | |
| 15 | 1.3956 | 1.3232 |
| 20 | 1.3939 | 1.3212 |
| 25 | 1.3931 | 1.3199 |
| 30 | 1.3915 | 1.3186 |
| $n_D{}^{25}$ | 1.4054 | 1.4025 |
| Viscosity, degrees: | | |
| +20 cp- | 475 | 240 |
| 0 cp- | 640 | 500 |
| −10 cp- | 1,100 | 3,500 |
| −20 cp- | 1,800 | 19,000 |
| −30 cp- | 2,500 | 100,000 |
| Vapor pressure, 25° mm. abs- | 9.6 | 12.5 |

TABLE III

*Some Physical Properties of Lithium Perchlorate-Monomethylamine-Ammonia Solutions*

| | |
|---|---|
| Percent wt. lithium perchlorate | 59.0 |
| Percent wt. monomethylamine | 23.1 |
| Percent wt. ammonia | 17.9 |
| Density, 25° | 1.1613 |
| $n_D{}^{25}$ | 1.3876 |
| Viscosity, °C.: | |
| +20 cp-- | 10 |
| 0 cp-- | 35 |
| −10 cp-- | 130 |
| −20 cp-- | 210 |
| −30 cp-- | --- |
| Vapor pressure, 25° C mm. abs-- | 140.9 |

The following table sets out the solubility of anhydrous lithium chloride in anhydrous monomethylamine.

TABLE IV

| Percent weight lithium chlorate | Percent weight monomethylamine | Mole ratio, amine to chlorate | Observations |
|---|---|---|---|
| 75.6 | 24.4 | 1:1 | Fluid slurry. |
| 67.3 | 32.7 | 1.5:1 | Some chlorate undissolved, solution more viscous. |
| 59.3 | 40.7 | 2:1 | Almost all chlorate dissolved, clear solution—gels when cooled. |
| 53.8 | 46.2 | 2.5:1 | Clear, viscous solution. |
| 49.0 | 51.0 | 3:1 | Gel at room temp. |

The following specific examples more fully illustrate my invention, but it is not intended that my invention be limited to the processes, reaction motors, or fuels described therein, but rather it is intended that all equivalents obvious to those skilled in the art be included within the scope of my invention as claimed.

EXAMPLE I

To test one of my compositions as a monopropellant 1.2 pounds per second of an equimolar mixture of monomethylamine and lithium perchlorate were injected into a small rocket thrust chamber through four converging injector nozzles. This propellant burns well and has a specific impulse of 211 seconds.

EXAMPLE II

To test one of my propellant compositions in a bipropellant system a small thrust chamber made up of available 1" stainless steel pipe and stainless steel pipe fittings was prepared. The fuel injection nozzle was made up from a pipe plug. An orifice diameter of 0.040" was drilled in the pipe plug and a needle valve assembly was seated in and welded onto the plug. For ease of repair a 1" union was used to attach the nozzle to the 4" pipe which comprised the burning chamber. An oxygen inlet tube and a bourdon-type pressure gauge with a range of 0–600 p.s.i. were attached to the burning chamber through the plug. A reducing coupling was utilized as the motor nozzle. A reaction mixture having a molar ratio of 2:1 monomethylamine to lithium perchlorate was introduced into the thrust chamber through the injector nozzle at the rate of 0.23 pound per minute. An approximately stoichiometric amount of gaseous oxygen was also introduced into the thrust chamber. Ignition was initiated by preheating the chamber to 625° C. The fuel burned well with good thrust.

EXAMPLE III

To test one of my propellant compositions in a bipropellant system a small thrust chamber made up of available 1" stainless steel pipe and stainless steel pipe fittings was prepared. The fuel injection nozzle was made up from a pipe plug. An orifice diameter of 0.040" was drilled in the pipe plug and a needle valve assembly was seated in and welded onto the plug. For ease of repair a 1" union was used to attach the nozzle to the 4" pipe which comprised the burning chamber. An oxygen inlet tube and a bourdon-type pressure gauge with a range of 0–600 p.s.i. were attached to the burning chamber through the plug. A reducing coupling was utilized as the motor nozzle. A reaction mixture of 60% lithium chlorate and 40% monomethylamine by weight was introduced into the thrust chamber through the injector nozzle at a rate of 0.3 cubic foot per minute. An approximately stoichiometric amount of gaseous oxygen was also introduced into the thrust chamber. Ignition was initiated by preheating the chamber to 625° C. The fuel burned well with good thrust.

This application is a continuation-in-part of my U.S. patent application Serial No. 735,922, filed May 19, 1958, now U.S. Patent No. 2,958,182, and Serial No. 859,100, filed December 14, 1959, and since abandoned.

Now having described my invention, what I claim is:

1. In a process for creating thrust in a reaction motor, the step which consists essentially of burning in said reaction motor a fluid mixture of monomethylamine and a salt selected from the group consisting of lithium chlorate and lithium perchlorate, said mixture containing from about 20% to about 75% by weight of a salt selected from the group consisting of lithium chlorate and lithium perchlorate and from about 25% to about 80% by weight of monomethylamine; to produce gases in said reaction motor and ejecting said gases from said reaction motor.

2. In a process for creating thrust in a monopropellant burning reaction motor, the step which consists essentially of burning in said monopropellant burning reaction motor a fluid mixture of monomethylamine and a salt selected from the group consisting of lithium chlorate and lithium perchlorate, said fluid mixture containing from about 60% to about 75% by weight of a salt selected from the group consisting of lithium chlorate and lithium perchlorate, and from about 25% to about 40% by weight of monomethylamine; to produce gases in said reaction motor and ejecting said gases from said reaction motor.

3. In a process for creating thrust in a monopropellant burning reaction motor, the step which consists essentially of burning in said monopropellant burning reaction motor a fluid mixture of monomethylamine and a salt selected from the group consisting of lithium chlorate and lithium perchlorate, said fluid mixtures containing from about 60% to about 75% by weight of a salt selected from the group consisting of lithium chlorate and lithium perchlorate, from about 20% to about 40% by weight of monomethylamine, not more than 20% by weight of an additive selected from the (A) group consisting of anhydrous ammonia, lower alkyl amines having at least two carbon atoms, ammonium perchlorate, lower alkanols, and monomethylamine nitrate, and not more than 5% of an additive selected from the (B) group consisting of aluminum and magnesium; to produce gases in said reaction motor and ejecting said gases from said reaction motor.

4. In a process for creating thrust in a monopropellant burning reaction motor, the step which consists essentially of burning in said monopropellant burning reaction motor a fluid mixture of monomethylamine and a salt selected from the group consisting of lithium chlorate and lithium perchlorate, said fluid mixture containing from about 20% to about 40% by weight of monomethylamine, and not more than 20% of an additive selected from the group consisting of anhydrous ammonia, lower alkyl amines having at least two carbon atoms, ammonium perchlorate, lower alkanols, and monomethylamine nitrate; to produce gases in said reaction motor and ejecting said gases from said reaction motor.

5. In a process for creating thrust in a monopropellant burning reaction motor, the step which consists essentially of burning in said monopropellant burning reaction motor a fluid mixture of monomethylamine and a salt selected from the group consisting of lithium perchlorate and lithium chlorate, said fluid mixture containing from about 60% to about 75% of a salt selected from the group consisting of lithium chlorate and lithium perchlorate, from about 25% to about 40% by weight of monomethylamine, and not more than 5% by weight of an additive selected from the group consisting of aluminum and magnesium; to produce gases in said reaction motor and ejecting said gases from said reaction motor.

6. In a process for creating thrust in a bipropellant burning reaction motor, the step which consists essentially of burning in said bipropellant burning reaction motor a fluid mixture of monomethylamine and a salt selected from the group consisting of lithium chlorate and lithium perchlorate, with an oxidizer selected from the group consisting of liquid oxygen, red-fuming nitric acid, white-fuming nitric acid, and nitrogen tetroxide, said fluid mixture containing from about 20% to about 60% by weight of a salt selected from the group consisting of lithium chlorate and lithium perchlorate and from about 40% to about 80% by weight of monomethylamine; to produce gases in said reaction motor and ejecting said gases from said reaction motor.

7. In a proces for creating thrust in a bipropellant burning reaction motor, the step which consists essentially of burning in said bipropellant burning reaction motor a fluid mixture of monomethylamine and a salt selected from the group consisting of lithium chlorate and lithium perchlorate, with an oxidizer selected from the group consisting of liquid oxygen, red-fuming nitric acid, white-fuming nitric acid, and nitrogen tetroxide, said fluid mixture containing from about 20% to about 60% by weight of a salt selected from the group consisting of lithium chlorate and lithium perchlorate, and from about 20% to about 80% by weight of monomethylamine, not more than 20% by weight of an additive selected from the group consisting of anhydrous ammonia, lower alkyl amines having at least two carbon atoms, lower alkanols, ammonium perchlorate, and monomethylamine nitrate, and not more than 5% by weight of an additive selected from the group consisting of aluminum and magnesium; to produce gases in said reaction motor and ejecting said gases from said reaction motor.

8. In a process for creating thrust in a bipropellant burning reaction motor, the step which consists essentially of burning in said bipropellant burning reaction motor a fluid mixture of monomethylamine and a salt selected from the group consisting of lithium chlorate and lithium perchlorate, with an oxidizer selected from the group consisting of liquid oxygen, red-fuming nitric acid, white-fuming nitric acid, and nitrogen tetroxide, said fluid mixture containing from about 20% to about 60% by weight of a salt selected from the group consisting of lithium chlorate and lithium perchlorate, and from about 20% to about 80% by weight of monomethylamine, and not more than about 20% by weight of an additive selected from the group consisting of anhydrous ammonia, lower alkyl amines having at least two carbon atoms, lower alkanols, ammonium perchlorate, and monomethylamine nitrate; to produce gases in said reaction motor and ejecting said gases from said reaction motor.

9. In a process for creating thrust in a bipropellant burning reaction motor, the step which consists essentially of burning in said bipropellant burning reaction motor a fluid mixture of monomethylamine and a salt selected from the group consisting of lithium chlorate and lithium perchlorate, with an oxidizer, selected from the group consisting of liquid oxygen, red-fuming nitric acid, white-fuming nitric acid, and nitrogen tetroxide, said fluid mixture containing from about 20% to about 60% by weight of salt selected from the group consisting of lithium chlorate and lithium perchlorate, and from about 40% to about 80% by weight of monomethylamine, and not more than about 5% by weight of an additive selected from the group consisting of aluminum and magnesium; to produce gases in said reaction motor and ejecting said gases from said reaction motor.

10. Propellant compositions consisting essentially of fluid mixtures of monomethylamine and a salt selected from the group consisting of lithium chlorate and lithium perchlorate, said mixtures containing from about 20% to about 75% by weight of a salt selected from the group consisting of lithium chlorate and lithium perchlorate and from about 25% to about 80% by weight of monomethylamine.

11. Monopropellant compositions consisting essentially of fluid mixtures of monomethylamine and a salt selected from the group consisting of lithium chlorate and lithium perchlorate, said mixtures containing from about 60% to about 75% by weight of a salt selected from the group consisting of lithium chlorate and lithium perchlorate and from about 25% to about 40% by weight of monomethylamine.

12. Monopropellant compositions consisting essentially of fluid mixtures of monomethylamine and a salt selected from the group consisting of lithium chlorate and lithium perchlorate, said mixtures containing from about 60% to about 75% by weight of a salt selected from the group consisting of lithium chlorate and lithium perchlorate and from about 20% to about 40% by weight of monomethylamine, not more than about 20% by weight of an additive selected from the (A) group consisting of lower alkanols, anhydrous ammonia, lower alkyl amines having at least two carbon atoms, ammonium perchlorate, and monomethylamine nitrate and not more than 5% by weight of an additive selected from the (B) group consisting of aluminum and magnesium.

13. Monopropellant compositions consisting essentially of fluid mixtures of monomethylamine and a salt selected from the group consisting of lithium chlorate and lithium perchlorate, said mixtures containing from about 60% to about 75% by weight of a salt selected from the group consisting of lithium chlorate and lithium perchlorate from about 20% to about 40% by weight of monomethylamine, and not more than 20% by weight of an additive selected from the group consisting of lower alkyl amines having at least two carbon atoms, anhydrous ammonia, lower alkanols, ammonium perchlorate, and monomethylamine nitrate.

14. Monopropellant compositions consisting essentially of fluid mixtures of monomethylamine and a salt selected from the group consisting of lithium chlorate and lithium perchlorate, said mixtures containing from about 60% to about 75% of a salt selected from the group consisting of lithium chlorate and lithium perchlorate, from about 25% to about 40% by weight of monomethylamine, and not more than 5% by weight of an additive selected from the group consisting of aluminum and magnesium.

15. Propellant compositions consisting essentially of fluid mixtures of monomethylamine and a salt selected from the group consisting of lithium chlorate and lithium perchlorate, said mixtures containing from about 20% to about 60% by weight of a salt selected from the group consisting of lithium chlorate and lithium perchlorate, and from about 40% to about 80% by weight of monomethylamine.

16. Propellant compositions consisting essentially of fluid mixtures of monomethylamine and a salt selected from the group consisting of lithium chlorate and lithium perchlorate, said mixtures containing from about 20% to about 80% by weight of monomethylamine, not more than 20% by weight of an additive selected from the (A) group consisting of anhydrous ammonia, lower alkyl amines having at least two carbon atoms, lower alkanols, ammonium perchlorate, and monomethylamine nitrate and not more than 5% by weight of an additive selected from the (B) group consisting of aluminum and magnesium.

17. Propellant compositions consisting essentially of fluid mixtures of monomethylamine and a salt selected from the group consisting of lithium chlorate and lithium perchlorate, said mixtures containing from about 20% to about 60% by weight of a salt selected from the group consisting of lithium chlorate and lithium perchlorate, from about 20% to about 80% by weight of monomethylamine, and not more than about 20% by weight of an additive selected from the group consisting of anhydrous ammonia, lower alkyl amines having at least two carbon atoms, lower alkanols, ammonium perchlorate, and monomethylamine nitrate.

18. Propellant compositions consisting essentially of fluid mixtures of monomethylamine and a salt selected from the group consisting of lithium chlorate and lithium perchlorate, said mixtures containing from about 20% to about 60% by weight of a salt selected from the group consisting of lithium chlorate and lithium perchlorate, from about 40% to about 80% by weight of monomethylamine, and not more than about 5% by weight of an additive selected from the group consisting of aluminum and magnesium.

No references cited.